United States Patent
Deantoni et al.

(10) Patent No.: US 10,266,717 B2
(45) Date of Patent: Apr. 23, 2019

(54) CORROSION-RESISTANT, CHROMIUM-FREE, SELF-PRIMING COATINGS CURABLE BY ULTRAVIOLET LIGHT

(71) Applicants: Dr. Ben Curatolo, Inc., Valley View, OH (US); The Boeing Company, Chicago, IL (US)

(72) Inventors: John R. Deantoni, Wildwood, MO (US); Benedict S. Curatolo, Valley View, OH (US)

(73) Assignees: Dr. Ben Curatolo, Inc., Valley View, OH (US); The Boeing Company, Chicago, IL (US)

( * ) Notice: Subject to any disclaimer, the term of this patent is extended or adjusted under 35 U.S.C. 154(b) by 594 days.

(21) Appl. No.: 14/562,157

(22) Filed: Dec. 5, 2014

(65) Prior Publication Data
US 2015/0086797 A1    Mar. 26, 2015

Related U.S. Application Data

(62) Division of application No. 11/562,323, filed on Nov. 21, 2006, now Pat. No. 8,920,885.

(51) Int. Cl.
C09D 133/08    (2006.01)
C08F 2/48    (2006.01)

(52) U.S. Cl.
CPC ............... C09D 133/08 (2013.01); C08F 2/48 (2013.01); *Y10T 428/31699* (2015.04)

(58) Field of Classification Search
None
See application file for complete search history.

(56) References Cited

U.S. PATENT DOCUMENTS

| | | | |
|---|---|---|---|
| 2,829,191 A | 4/1958 | Rogers, Jr. | |
| 4,319,942 A | 3/1982 | Brenner | |
| 5,008,301 A | 4/1991 | Dennis et al. | |
| 5,128,387 A * | 7/1992 | Shustack | C09D 4/06 522/33 |
| 5,523,152 A | 6/1996 | Thurber et al. | |
| 5,763,099 A | 6/1998 | Misev et al. | |
| 5,824,373 A | 10/1998 | Biller et al. | |
| 5,851,247 A | 12/1998 | Stoetzel et al. | |
| 6,096,795 A | 8/2000 | Abusleme et al. | |
| 6,449,413 B1 | 9/2002 | Duecker | |
| 6,512,021 B1 | 1/2003 | Sugiki et al. | |

(Continued)

OTHER PUBLICATIONS

Shukla, et al., "Review of Basic Chemistry of UV-Curing Technology", Pigment & Resin Technology, 2004, pp. 272-279, vol. 33, No. 5, Emerald Group Publishing limited.

(Continued)

*Primary Examiner* — Ronak C Patel
(74) *Attorney, Agent, or Firm* — Curatolo Sidoti Co., LPA; Joseph G. Curatolo; Salvatore A. Sidoti (57) ABSTRACT

Corrosion-resistant, self-priming coatings that are curable by ultraviolet energy and methods for coating surfaces using such coatings have been provided. In an exemplary embodiment, a method for coating a surface includes formulating a chromium-free, self-priming coating, applying the chromium-free, self-priming coating to the surface, and curing the chromium-free, self-priming coating with ultraviolet light.

7 Claims, 1 Drawing Sheet

(56) References Cited

U.S. PATENT DOCUMENTS

| | | | |
|---|---|---|---|
| 6,893,687 B2* | 5/2005 | Maurus | C09D 5/08 |
| | | | 427/508 |
| 7,192,639 B2 | 3/2007 | Philipson | |
| 2003/0087201 A1* | 5/2003 | Wu | C23F 1/02 |
| | | | 430/324 |
| 2004/0157003 A1 | 8/2004 | Baumgart et al. | |
| 2005/0065269 A1 | 3/2005 | Hintze-Bruning et al. | |
| 2005/0170101 A1* | 8/2005 | Ramsey | B05D 7/14 |
| | | | 427/487 |
| 2005/0186442 A1* | 8/2005 | Gros | C09D 5/08 |
| | | | 428/626 |
| 2005/0192384 A1 | 9/2005 | Jung et al. | |
| 2006/0228481 A1* | 10/2006 | Gros | C08F 251/02 |
| | | | 427/299 |

OTHER PUBLICATIONS

Biography of Dr. Mark D. Soucek, Associate Professor of Polymer Engineering, Department of Polymer Engineering, Academic Center, The University of Akron, Akron, OH 44325-0301.

De Raeve, "New Perspectives in Product Development and Pollution Control Through the Use of Ultraviolet Polymerisation", Hogeschool Gent, Jun. 7, 2005.

\* cited by examiner

CORROSION-RESISTANT, CHROMIUM-FREE, SELF-PRIMING COATINGS CURABLE BY ULTRAVIOLET LIGHT

CROSS REFERENCE TO RELATED APPLICATIONS

This present application is a divisional application of co-pending U.S. Ser. No. 11/562,323 filed Nov. 21, 2006, from which application priority is claimed.

TECHNICAL FIELD

The embodiments described herein generally relate to protective coatings, and more particularly relate to corrosion-resistant, chromium-free, self-priming coatings that are curable by ultraviolet light and methods for painting surfaces, particularly aircraft and spacecraft, using ultraviolet light-curable, corrosion-resistant, chromium-free, self-priming coatings.

BACKGROUND

Aircraft utilize a protective coating system that is applied to the aircraft to minimize corrosion and resistance of the exterior surface of an aircraft and to provide the desired color, infrared properties, impact resistance, and gloss to the exterior surface. Current protective coating systems often consist of a primer and a separate topcoat film, both individually applied to the aircraft. Primer coatings that meet current military specifications typically are epoxy resins pigmented with strontium chromate for corrosion protection. Topcoats that meet current military specifications typically are polyurethane resins with appropriate pigmentation to provide color, infrared properties, and low gloss.

However, such protective coating systems suffer from several distinct drawbacks. Corrosion inhibitors containing chromium (VI) compounds, such as strontium chromate, are widely and effectively used to control corrosion of aluminum alloys, such as those used to make military aircraft. However, while these chromium compounds have excellent corrosion protective and inhibitive properties, they are toxic and suspected carcinogens. Compliance with current environmental, safety and health regulations relating to chromium use is expensive. As trends to increase the stringency of occupational health and environmental regulations continue, the use of chromium may no longer be feasible.

In addition, high performance coating systems typically contain volatile organic compounds (VOCs), which result in the production of smog, and hazardous air pollutants (HAPs) such as methyl ethyl ketone (MEK), toluene, and xylene. Standards for emissions continue to become stricter. Accordingly, the indefinite continuation of current technology utilizing compounds that release VOCs and HAPs is not only undesirable, but may not be possible in the future.

The above-described coatings also are logistically and operationally undesirable. A key area of concern in the aerospace/military industry is cycle time reduction for systems applications. It is also desirable for coating systems to be easily and quickly repairable in the event of damage. However, the current coating systems require the application of two separate coatings, the primer and the topcoat. In addition, the curing time for current aerospace/military coatings can be as long as 72 hours or more, significantly reducing the operation availability of the aircraft.

Accordingly, it is desirable to provide a protective corrosion-resistant coating for military and commercial aircraft and spacecraft that does not utilize chromium or chromium compounds and that releases minimal or no VOCs or HAPs. In addition, it is desirable to provide a protective coating for military and commercial aircraft and spacecraft that can be applied and cured quickly. It is also desirable to provide a method for painting an aircraft with such a protective coating system. Furthermore, other desirable features and characteristics of the chrome-free, self-priming coating will become apparent from the subsequent detailed description and the appended claims, taken in conjunction with the accompanying drawings and the foregoing technical field and background.

BRIEF SUMMARY

In an exemplary embodiment, a method for coating a surface comprises the steps of formulating a chromium-free, self-priming coating, applying the chromium-free, self-priming coating to the surface, and curing the chromium-free, self-priming coating with ultraviolet light.

In another exemplary embodiment, a coating for a surface comprises: an acrylated oligomer selected from the group consisting of acrylates, methacrylates, diacrylates, triacrylates, and polyacrylates; a monomer selected from the group consisting of acrylates, methacrylates, diacrylates, triacrylates, polyacrylates, allyl compounds, vinyl ethers, vinyl esters, vinyl carboxylic acids, vinyl carboxylic acid salts, vinyl amides, unsaturated dicarboxylic acids, and derivatives thereof; a photoinitiator; and a chromium-free corrosion inhibitor.

In a further exemplary embodiment, a method for coating a surface comprises combining to form a single mixture an acrylated oligomer selected from the group consisting of acrylates, methacrylates, diacrylates, triacrylates, and other polyacrylates, a monomer selected from the group consisting of acrylates, methacrylates, diacrylates, triacrylates, polyacrylates, allyl compounds, vinyl ethers, vinyl esters, vinyl carboxylic acids, vinyl carboxylic acid salts, vinyl amides, unsaturated dicarboxylic acids, and derivatives thereof, a photoinitiator, a chromium-free corrosion inhibitor, and a pigment. The mixture is applied to the surface and is exposed to ultraviolet light.

BRIEF DESCRIPTION OF THE DRAWINGS

Various embodiments will hereinafter be described in conjunction with the following drawing FIGURES, wherein like numerals denote like elements, and wherein.

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

A protective coating, in accordance with an exemplary embodiment, comprises an oligomer, a monomer, a photoinitiator, and a corrosion inhibitor such that the protective coating provides corrosion resistance, is free of chromium, and releases minimal or no VOCs and HAPs. The coating is cured by ultraviolet (UV) light and is applied to a surface as a "self-priming" coating. As used herein, a "self-priming" coating means a single coating, or a coating that can be applied in a single application, that contains a corrosion inhibitor, typically found in primer coatings, with oligomers and monomers that generally determine the physical properties of a topcoat, such as weatherability and viscosity. Accordingly, the UV-curable, self-priming coating decreases manufacturing cycle times and thus decreases the amount of time an aircraft is operationally unavailable. While the protective coating is described herein for use on military and commercial aircraft and spacecraft, it will be understood that the protective coating is not so limited, and may be used on trains, in marine ship applications, automotive applications, and other vehicle and industrial applications.

The oligomer of the protective coating generally determines the physical properties and characteristics of the protective coating. In one exemplary embodiment, oligomers useful for formulating the protective coating include acrylated oligomers selected from the group consisting of acrylates, methacrylates, diacrylates, triacrylates, and other polyacrylates. As used herein, the term "acrylates" is used generally to include derivatives of acrylic acid as well as derivatives of substituted acids, such as, for example, methacrylic acid, ethacrylic acid, and the like, unless clearly indicated otherwise, and therefore encompasses methacrylates, ethacrylates, etc. Examples of acrylated oligomers include aliphatic polyether urethane acrylates, diacrylates, triacrylates, and polyacrylates; aliphatic polyester urethane acrylates, diacrylates, triacrylates, and polyacrylates; aromatic polyether urethane acrylates, diacrylates, triacrylates, and polyacrylates; aromatic polyester urethane acrylates, diacrylates, triacrylates, and polyacrylates; polyester acrylates, diacrylates, triacrylates, and polyacrylates; polyether acrylates, diacrylates, triacrylates, and polyacrylates; epoxy acrylates, diacrylates, triacrylates, and polyacrylates; polyamine acrylates, diacrylates, triacrylates, and polyacrylates; and acrylated acrylic oligomers. Aliphatic polyether urethane acrylates, diacrylates, and triacrylates, and aliphatic polyester urethane acrylates, diacrylates, and triacrylates are preferred for their flexibility and weather-resistant properties. An example of an aliphatic urethane diacrylate is Photomer® 6230 and an example of an aliphatic urethane triacrylate oligomer is Photomer® 6892, both available from Cognis Corp. of Cincinnati, Ohio. Another example of an aliphatic urethane diacrylate oligomer is CN991 and an example of an aliphatic urethane diacrylate oligomer blended with 25% isobornyl acrylate is CN966J75, both available from Sartomer Company, Inc. of Exton, Pa.

The monomer of the protective coating generally influences the viscosity and cure speed of the coating, as well as physical properties and characteristics. Monomers useful for formulating the protective coating include acrylates, methacrylates, diacrylates, triacrylates, polyacrylates, allyl compounds, vinyl ethers, vinyl esters, vinyl carboxylic acids, vinyl carboxylic acid salts, vinyl amides, and unsaturated dicarboxylic acids, and derivatives thereof.

Examples of acrylate monomers which can be utilized in the protective coating include, but are not limited to, one or more of the following: ethylhexyl acrylate, 2-ethoxyethyl acrylate, cyclohexyl acrylate, lauryl acrylate, stearyl acrylate, such as SR 257 available from Sartomer Company, Inc. of Exton, Pa., alkoxylated phenol acrylates, alkoxylated nonylphenol acrylates, nonylphenol acrylate, isobornyl acrylate, such as SR506D available from Sartomer Company, Inc., acrylated epoxy soya oil, acrylated epoxy linseed oil, caprolactone acrylate, 2-phenoxyethyl acrylate, benzyl acrylate, monomethoxy tripropylene glycol monoacrylate, monomethoxy neopentyl glycol propoxylate monoacrylate, 1,3-butanediol diacrylate, 1,4-butanediol diacrylate, 1,6-hexanedioldiacrylate, 1,8-octanediol diacrylate, 1,10-decanediol diacrylate, polybutadiene diacrylate, trimethylolpropane triacrylate, glyceryl triacrylate, pentaerythritol triacrylate, pentaerythritoltetraacrylate, dipentaerythritol pentaacrylate, di-trimethylolpropane tetraacrylate, tris(2-hydroxyethyl)isocyanurate triacrylate, tetrahydrofurfuryl acrylate, isooctyl acrylate, isodecyl acrylate, such as SR 395 available from Sartomer Company, Inc., 2-(2-ethoxyethoxy) ethyl acrylate, ethylene glycol diacrylate, propylene glycol diacrylate, neopentyl glycol diacrylate, cyclopentenyl oxyethyl acrylate, 9-anthracenyl methyl acrylate, 1-pyrenylmethyl acrylate, and Fluorescein diacrylate. As used herein, the terms "acrylic" and "acrylate" should be defined generally to include derivatives of acrylic acids as well as substituted acrylic acids such as methacrylic acid, ethacrylic acid, etc., with alkyl chains of 1 to 8 carbon atoms, unless clearly indicated otherwise. Also included are acrylate/methacrylate combinations and mixtures. For instance, the above listing therefore is understood to include methacrylate monomers including, but not limited to, one or more of the following: ethylhexyl methacrylate, 2-ethoxyethyl methacrylate, cyclohexyl methacrylate, lauryl methacrylate, stearyl methacrylate, such as SR 324 available from Sartomer Company, Inc., alkoxylated phenol methacrylates, alkoxylated nonylphenol methacrylates, nonylphenol methacrylate, isobornyl methacrylate, methacrylated epoxy soya oil, methacrylated epoxy linseed oil, caprolactone methacrylate, 2-phenoxyethyl methacrylate, benzyl methacrylate, monomethoxy tripropylene glycol monomethacrylate, monomethoxy neopentyl glycol propoxylate monomethacrylate, 1,3-butanediol dimethacrylate, 1,4-butanediol dimethacrylate, 1,6-hexanedioldimethacrylate, 1,8-octanediol dimethacrylate, 1,10-decanediol dimethacrylate, polybutadiene dimethacrylate, trimethylolpropane trimethacrylate, glyceryl trimethacrylate, pentaerythritol trimethacrylate, pentaerythritoltetramethacrylate, dipentaerythritol pentamethacrylate, di-trimethylolpropane tetramethacrylate, tris(2-hydroxyethyl)isocyanurate trimethacrylate, tetrahydrofurfuryl methacrylate, isooctyl methacrylate, isodecyl methacrylate, 2-(2-ethoxyethoxy) ethyl methacrylate, ethylene glycol dimethacrylate, propylene glycol dimethacrylate, neopentyl glycol dimethacrylate, cyclopentenyl oxyethyl methacrylate, 9-anthracenyl methyl methacrylate, 1-pyrenylmethyl methacrylate, Fluorescein dimethacrylate, and acrylate/methacrylate combinations.

Examples of monomers that can be utilized in the protective coating also include, but are not limited to, one or more of the following acrylate compounds containing alkoxy units, as well as the corresponding methacrylates, higher alkyl acrylates, and mixtures thereof: diethylene glycol diacrylate, triethylene glycol diacrylate, tetraethylene glycol diacrylate, polyethylene glycol diacrylate, dipropylene glycol diacrylate, tripropylene glycol diacrylate, tetrapropylene glycol diacrylate, polypropylene glycol diacrylate, glyceryl ethoxylate diacrylate, glyceryl propoxylate diacrylate, glyceryl ethoxylate triacrylate, glyceryl propoxylate triacrylate, trimethylolpropane ethoxylate triacrylate, trimethylolpropane propoxylate triacrylate, such as SR492 available from Sartomer Company, Inc., neopentylglycol ethoxylate diacrylate, neopentylglycol propoxylate diacrylate, monomethoxy trimethylolpropane ethoxylate diacrylate, monomethoxy trimethylolpropane propoxylate diacrylate, pentaerythritol ethoxylate tetraacrylate, such as SR494 available from Sartomer Company, Inc., pentaerythritol propoxylate tetraacrylate, dipentaerythritol ethoxylate pentaacrylate, dipentaerythritol propoxylate pentaacrylate, di-trimethylolpropane ethoxylate tetraacrylate, di-trimethylolpropane propoxylate tetraacrylate, Bisphenol A ethoxylate diacrylate, and Bisphenol A propoxylate diacrylate.

Examples of allyl compounds that can be utilized in the protective coating include, but are not limited to, allyl propoxylate, allyl cinnamate (allyl 3-phenylacrylate) available from Sigma-Aldrich Company of St. Louis, Mo., diallyl phthalate, tripropyleneglycol diallyl ether, pentaerythritol allyl ether, trimethylolpropane diallyl ether, trimethylolpropane monoallyl ether, triallyl cyanurate, triallyl isocyanumte, and hydroxy terminated ethyleneglycol bis[pentakis (glycidyl allyl ether)]ether. The monomers also may contain more than one type of reactive group, for example allyl methacrylate, ethoxylated allyl methacrylate, propoxylated allyl methacrylate, and di(propyleneglycol) allyl ether methacrylate.

Examples of vinyl ethers which can be utilized in the protective coating include, but are not limited to, ethyl vinyl ether, butyl vinyl ether, hydroxy butyl vinyl ether, cyclohexyl vinyl ether, 2-ethylhexyl vinyl ether, octyl vinyl ether, decyl vinyl ether, dodecyl vinyl ether, octadecyl vinyl ether, cyclohexane dimethanol monovinyl ether, phenyl vinyl ether, 1,6-hexanediol divinyl ether, 1,4-cyclohexane dimethanol divinyl ether, diethylene glycol divinyl ether, triethylene glycol divinyl ether, tetraethylene glycol divinyl ether, dipropylene glycol divinyl ether, tripropylene glycol divinyl ether, tetrapropylene glycol divinyl ether, and the propenyl ether of propylene carbonate. Examples of vinyl esters include vinyl propionate, vinyl acetate, and vinyl 2-ethyl hexanoate.

The protective coating is curable by UV light and generally contains at least one photoinitiator. Photoinitiators absorb UV radiation and generate species that initiate polymerization. Photoinitiators may be classified in two major groups based upon a mode of action. Cleavage-type photoinitiators include acetophenones, benzoin ethers, benzoyl oximes, and acyl phosphines. Abstraction-type photoinitiators include benzophenone, Michler's ketone, thioxanthones, anthraquinone, camphorquinone and ketocoumarin. Abstraction-type photoinitiators function better in the presence of materials such as amines and other hydrogen donor materials added to provide labile hydrogen atoms for abstraction. In the absence of such added materials, photoinitiation may still occur via hydrogen abstraction from monomers, oligomers, or other components of the system.

Examples of photoinitiators that may be used include, but are not limited to, one or more of the following: benzophenone, benzyldimethyl ketal, isopropylthioxanthone, bis(2,4,6-trimethybenzoyl)phenylphosphine oxide, bis(2,6-dimethoxybenzoyl)(2,4,4-trimethylpentyl)phosphine oxide, 2-hydroxy-2-methyl-1-phenyl-1-propanone, diphenyl(2,4,6-trimethybenzoyl)phosphine oxides, 1-hydroxycyclohexyl phenyl ketone, 2-benzyl-2-(dimethylamino)-1-[4-(4-morpholinyl)phenyl]-1-butanone, α,α-dimethoxy-α-phenylacetophenone, 2,2-diethoxyacetophenone, 2-methyl-1-[4-(methylthio)phenyl]-2-(4-morpholinyl)-1-propanone, and 2-hydroxy-1-[4-(hydroxyethoxy)phenyl]-2-methyl-1-propanone. In one exemplary embodiment, the photoinitiator is an acylphosphine oxide due to favorable absorption characteristics in the high wavelength region of the UV spectrum that are not obscured by pigment absorption. In another exemplary embodiment, the photoinitiator is bisacylphosphine oxide (BAPO).

Combinations of photoinitiators may be used to achieve the most appropriate degree of through cure and surface cure of coating compositions for desired appearance and properties. Reactive photoinitiators, which contain polymerizable groups, may also be used to react the photoinitiator molecules into the polymer matrix. The cure process is generally more efficient in the absence of oxygen, for example, in the presence of nitrogen, so a greater amount of photoinitiator is generally required in the presence of oxygen.

Examples of hydrogen donor materials that may be utilized in combination with photoinitiators include, but are not limited to, one or more of the following: ethyl-4-dimethylaminobenzoate, octyl-p-(dimethylamino)benzoate, N-methyldiethanolamine, dimethylethanolamine, triethanolamine, tri-n-propylamine, diethylethanolamine, triethylamine, diisopropylethylamine, diisopropylethanolamine, dimethylaminomethylphenol, tris(dimethylaminomethyl)phenol, benzyldimethylamine, amine acrylates, and amine methacrylates.

In addition, the protective coating also comprises a corrosion inhibitor. Examples of corrosion inhibitors include chromium-free rare-earth inhibitors, such as Rhett P3 available from Deft, Inc. of Irvine, Calif., Hybricor™ 204 (previously Wayncor® 204) from Wayne Pigment Corp. of Milwaukee, Wis., and poly(2,5-dimercapto-1,3,4-thiadiazole (PolyDMcT) available from Crosslink of St. Louis, Mo.

In addition to the above-described components, in an exemplary embodiment, the protective coating may include other pigment and additive compounds known to those of skill in the art. These compounds may include, but are not limited to pigments, fillers, fluorescent additives, flow and leveling additives, wetting agents, surfactants, antifoaming agents, rheology modifies, adhesion promoters, optical brighteners, stabilizers, and antioxidants. Exemplary additives are those that do not have appreciable absorption in the UV wavelengths spectra used to cure the coating. Examples of pigments and filler materials include, but are not limited to, titanium dioxide, such as Ti-Pure® R960 available from E. I. du Pont de Nemours and Company of Wilmington, Del. and Tioxide® TR93 available from Huntsman International LLC of Salt Lake City, Utah, colloidal silica, such as Syloid® Rad 2005 and Syloid® ED-30 available from Grace Davison of Columbia, Md., hydrophilic silica, hydrophobic amorphous fumed silica, amorphous precipitated silica, magnesium silicate, calcium carbonate, calcium silicate, carbon black, and polymer powders.

Examples of flow and leveling additives, wetting agents, and antifoaming agents that may be used to formulate the protective coating include silicones, modified silicones, silicone acrylates, hydrocarbons, fluorine-containing compounds, and non-silicone polymers and copolymers such as copolyacrylates.

Types of stabilizers that may be used to formulate the protective coating include hydroxyphenylbenzotriazoles, hydroxyphenyltriazines, oxalanlides, such as Sandovur® 3206 available from Clariant International Ltd. of Muttenz, Switzerland, hindered amine light stabilizers (HALS), and acetylated hindered amine light stabilizers, such as Sanduvor® 3068 available from Clariant. Examples of stabilizers may include, but are not limited to, 2-(2'-hydroxy-5'-methylphenyl)-benzotriazole, 2-(3',5'-di-tert-butyl-2'-hydroxyphenyl)-5-chlorobenzotriazole, 2-(2'-hydroxy-3',5'-di-tert-amylphenyl)-benzotriazole, benzenepropanoic acid 3-(2H-benzothazol-2-yl)-5-(1,1-dimethylethyl)-4-hydroxy-C7-9-branched alkyl esters, 2-(3',5'-bis(1-methyl-1-phenylethyl)-2'-hydroxyphenyl)benzotriazole, 2-[2'-hydroxy-3-dimethylbenzylphenyl-5-(1,1,3,3-tetramethylbutyl)]-2H- benzotriazole, poly(oxy-1,2-ethanediyl)α-[3-][3-(2H-benzotriazol-2-yl)-5-(1,1-dimethylethyl)-4-hydroxyphenyl]-1-oxopropyl]-ω-hydroxy and poly(oxy-1,2-ethanediyl)α-[3-][3-(2H-benzotriazol-2-yl)-5-(1,1-dimethylethyl)-4-hydroxyphenyl]-1-oxopropyl]-ω-[3-][3-(2H-benzotriazol-2-yl)-5-(1,1-dimethylethyl)-4-hydroxyphenyl]-1-oxopropoxy]-, 2-[4-[2-hydroxy-3-tridecyl oxypropyl]oxy]-2-hydroxyphenyl]-4,6-bis(2,4-dimethylphenyl)-1,3,5-triazine and 2-[4-[2-hydroxy-3-dodecyl oxypropyl]oxy]-2-hydroxyphenyl]-4,6-bis(2,4-dimethylphenyl)-1,3,5-triazine, bis(1,2,2,6,6-pentamethyl-4-piperidinyl)(3,5-di-tert-butyl-4-hydroxybenzyl)butylpropanedioate, bis(2,2,6,6-tetramethyl-4-piperidinyl)sebacate, tetrakis[methylene(3,5-di-tert-butyl-4-hydroxy-hydrocinnamate)]methane, thiodiethylene bis(3,5-di-tert-butyl-4-hydroxy-hydrocinnamate), octadecyl 3,5-di-tert-butyl-4-hydroxyhydro-cinnamate, bis(1,2,2,6,6-pentamethyl-4-piperidinyl)sebacate, methyl (1,2,2,6,6-pentamethyl-4-piperidinyl)sebacate, tris(2,4-di-tert-butylphenyl) phosphite, and decanedioic acid bis(2,2,6,6-tetramethyl-4-piperidinyl) ester reaction products with 1,1-dimethyl-ethylhydroperoxide and octane.

The protective coating, once formulated and applied to a surface, is cured by UV light. The UV light may be provided by any suitable source, such as, for example, mercury vapor lamps, pulsed xenon lamps, LED lamps, electroless lamps, and the like. The UV light lamp may comprise one or more of Fusion H bulbs, D bulbs, Q bulbs, V bulbs, and the like, used simultaneously or serially. In an exemplary embodiment, the coating is cured using UV light from a Fusion V bulb followed by UV light from a Fusion H bulb. Though not wishing to be bound by theory, the V bulb has a longer wavelength that permeates the coating, thus providing more efficient curing throughout the coating, while the H bulb has a shorter wavelength that provides a more efficient surface cure. For the highest curing efficiency, the choice of photoinitiator or photoinitiator combinations, with characteristic absorbance spectra, should be matched with the spectral output of the bulb(s). Bulb type and intensity, exposure time, and photoinitiator choice and concentration can be adjusted to control speed of cure for a predetermined coating appearance, with faster surface cure generally corresponding to higher gloss values.

In another embodiment, the protective coating further comprises components that impart a secondary cure mechanism that is active in the absence of UV light. The secondary cure mechanism functions to improve coating properties after the removal of UV light, and also functions to provide coating cure in the absence of UV light, for example, in areas that are shadowed from the UV light. Along with the primary UV cure, addition of a secondary cure mechanism results in a dual cure coating, and addition of more than one additional cure mechanism to the primary UV cure results in a multiple cure mechanism coating. Examples of additional cure mechanisms that may be used for curing of the protective coating include free-radical cure of unsaturated compounds with a peroxide, such as cumene hydroperoxide, activated peroxide cure using tertiary amines or metal compounds, activated cure in the absence of peroxides using tertiary amines or metal compounds, oxidative cure of double bonds in air initiated by oxygen radicals, and combinations thereof. An example of a cumene hydroperoxide is Clear Catalyst® 11 available from Sigma-Aldrich. Company of St. Louis, Mo. Isocyanate cures also may be used, although use of isocyanates may increase the amount of VOCs and HAPs of the coating.

In one embodiment, the compositions of the protective coating may be a one-part composition in which all components of the coating can be mixed together in no particular sequence or order. In another embodiment, for example in certain dual-cure or multiple-cure coating compositions, the compositions of the protective coating may be a two-part or a multiple-part composition, with different parts of the composition mixed together immediately before application of the coating. For example, in compositions using an activated peroxide cure mechanism as a secondary cure mechanism, an activator may be separated from the peroxide until immediately before use. In a further embodiment, the monomers, activator, and peroxide are all in separate parts, with all three parts mixed together immediately before application. In compositions using an isocyanate cure as a secondary cure mechanism, the composition may be a one-part composition if the components do not contain amines, hydroxyl-containing compounds, or moisture. In exemplary embodiments, in compositions using an isocyanate cure as a secondary cure mechanism, the composition is at least a two-part composition, with the isocyanate-containing compound or compounds in a part separate from most of the other components, with the separate parts mixed together immediately before use.

For coating compositions using isocyanate cure as a secondary cure mechanism, secondary cure components may include, but are not limited to, at least one material having at least one isocyanate unit, and/or at least one material having at least one acrylate unit and at least one isocyanate unit in the same molecule. In certain embodiments, amine or hydroxyl-containing compounds may also be used to react with the isocyanate-containing material. In these embodiments, the coating compositions may include, but are not limited to, at least one material containing at least one hydroxyl group, at least one material containing at least one amine group, at least one material containing at least one hydroxyl group and at least one acrylate unit in the same molecule, at least one material containing at least one hydroxyl group and at least one allyl unit in the same molecule, and/or at least one material containing at least one amine group and at least one acrylate unit in the same molecule. Examples of dual functional components containing an acrylate group and an isocyanate group include Roskydal® VP LS 2396 and Roskydal® VP LS 2337 from Bayer MaterialScience AG of Leverkusen, Germany. Isocyanate-containing polyurethane precursors and hydroxyl-containing polyurethane precursors known to those of skill in the art may also be used along with UV curable components in the coating compositions of the present invention. Hydroxy-terminated polymers may also be used, such as hydroxy-terminated polybutadienes. An example of a hydroxyl-terminated polybutadiene for use in the protective coating is Poly Bd® R20LM available from Sartomer Company, Inc. of Exton, Pa. With the use of hydroxyl-containing compounds, reaction with the isocyanate groups results in the formation of polyurethane linkages, and the ratio of isocyanate/hydroxyl groups can be varied to vary the properties of the resulting coating. In the absence of hydroxyl-containing compounds, isocyanate groups can still react through a different cure mechanism of moisture cure known to those of skill in the art.

In another embodiment, the composition of the protective coating may comprise components for several different cure mechanisms. In one embodiment, a hybrid composition may comprise components for UV cure, isocyanate cure, and oxidative cure. In another embodiment, a hybrid composition may comprise components for UV cure, isocyanate cure, and activated free radical cure. For example, a coating composition may comprise at least one acrylate for UV cure, at least one isocyanate-containing compound for moisture cure or urethane formation, and at least one allyl compound for oxidative cure.

Activator compounds may also be used to facilitate oxidative and free radical cure. Types of activator compounds include tertiary amines and metal compounds. Examples of activator compounds that may be used to formulate the protective coating include compounds of barium, calcium, cerium, cobalt, copper, iron, manganese, strontium, zinc, zirconium, and mixtures thereof. In an exemplary embodiment, suitable activator compounds comprise at least one 2-ethylhexanoic metal salt or an isomer thereof, such as Octa-Soligen® 69HS available from Borchers GmbH of Langenfeld, Germany. Metal salts of 2-ethylhexanoic acid are also known as metal octoates.

In accordance with an exemplary embodiment, a method 20 for coating a surface using the various embodiments of the protective coating described above is illustrated in FIG. 1. The method comprises the step of formulating a chromium-free, self-priming coating, such as the protective coating described above, comprising a corrosion inhibitor (step 22). The coating is formulated using one or more of the oligomers, monomers, photoinitiators, and corrosion inhibitors set forth above. In addition, the coating may be formulated using any of the pigments, fillers, fluorescent additives, flow and leveling additives, wetting agents, surfactants, antifoaming agents, rheology modifies, adhesion promoters, optical brighteners, stabilizers, antioxidants, and secondary or multiple cure mechanisms described above. The various components are then suitably combined depending on whether the coating is a one-part, two-part, or multiple-part composition. In an exemplary embodiment, solid photoinitiators are dissolved in monomer(s) before combination with other components. Corrosion inhibitors may also be dispersed in oligomer(s) before combination with other components. The components can be mixed at room temperature with stirring, shaking, agitation, and/or the like, and heating may be employed to facilitate the mixing. If the components of the composition undergo separation during storage, mild agitation or mixing prior to use may be performed to disperse the components. Prior to application, as described in more detail below, all components are combined by stirring, shaking agitation, and/or the like.

Figure 1:
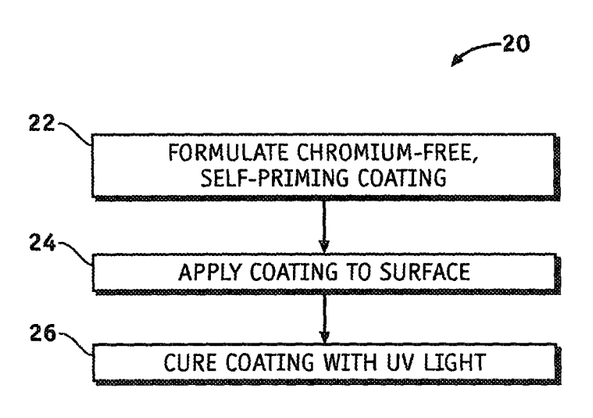
FIG. 1 is a flowchart of a method for coating a surface with a protective coating, in accordance with an exemplary embodiment.

After formulation of the coating, the coating is applied to a surface (step 24). The coating may be applied to a surface by roller coating, brushing, spraying, or by any other means known in the art. In an exemplary embodiment, the coating may be heated or cooled to facilitate the application process.

Following application of the coating to the surface, the coating is cured using UV energy (step 26). As described above, in various exemplary embodiments, the photoinitiator used to formulate the coating, with characteristic absorbance spectra, is matched with the spectral output of the bulb that is used to provide the UV energy. The coating is exposed to the UV energy for a time sufficient to cause the coating to cure. In one exemplary embodiment of the invention, the coating is exposed to a total UV energy of about 0 to about 10 J/cm$^2$ UVA energy, in certain embodiments about 3 to about 7 J/cm$^2$ UVA energy, about 0 to about 8 J/cm$^2$ UVB energy, in certain embodiments about 2 to about 5 J/cm$^2$ UVB energy, and about 0 to about 5 J/cm$^2$ UVC energy, in certain embodiments about 0.2 to about 2 J/cm$^2$ UVC energy.

The following are examples of various compositions of the protective coating described above. The examples are illustrative in nature and are not meant to limit the embodiments of the protective coating in any way. The exemplary protective coatings are single-application, self-priming coatings that exhibit corrosion resistance, are chromium-free, and release minimal or no VOCs and HAPs. Unless indicated, all components are listed in weight percent (wt. %). Each of the protective coatings was applied as about 50 micron (about 2 mils) coatings on aluminum panels. The panels were placed on a conveyor belt moving at about 1.5 m/min (about 5 feet/min) and were cured by exposure to a 600 watt/inch Fusion V bulb followed by exposure to a 600 watt/inch Fusion H bulb. The panels were exposed to a total UV energy of 6.7 J/cm$^2$ UVA energy, 4.9 J/cm$^2$ UVB energy, and 0.67 J/cm$^2$ UVC energy.

| Example 1 | wt. % |
|---|---|
| Hybricor 204 | 38.10 |
| Airex 900 | 0.22 |
| Disperbyk 111 | 1.89 |
| SR 506D | 8.53 |
| CN991 | 21.51 |
| Photomer 6892 | 10.48 |
| Sanduvor 3068 | 0.24 |
| Sanduvor 3206 | 0.35 |
| Ti-Pure R960 | 1.46 |
| Syloid Rad 2005 | 2.33 |
| Black 97076 | 1.07 |
| SR395 | 4.95 |
| PI 191 | 3.78 |
| Allyl cinnamate | 1.09 |
| SR 324 | 1.09 |
| SR 257 | 1.09 |
| Ebecryl 170 | 1.82 |
| | 100.00 |

Airex 900 is a defoamer available from Tego Chemie Service GmbH of Essen, Germany. Disperbyk® is a wetting agent available from BYK-Chemie of Wesel, Germany. Black 97076 is a pigment dispersion available from Light Curable Coatings of Valley View, Ohio. PI 191 is a liquid photoinitiator concentrate available from Light Curable Coatings. Ebecryl 170 is an adhesion promoter acrylate available from Surface Specialties, formerly of UCB Chemicals of Brussels, Belgium, now of Cytec Industries of West Patterson, N.J.

| Example 2 | wt. % |
|---|---|
| ELM-136-52 | 57.24 |
| Airex 900 | 0.57 |
| Photomer 6230 | 11.45 |
| Sanduvor 3068 | 0.35 |
| Sanduvor 3206 | 0.35 |
| Ti-Pure R960 | 2.29 |
| Syloid Rad 2005 | 2.13 |
| Black 97076 | 1.806 |
| Blue G49UV15 | 0.022 |
| Red G19UV57 | 0.002 |
| SR395 | 12.32 |
| PI 130 | 4.56 |
| Allyl Cinnamate | 1.54 |
| SR 324 | 1.54 |
| SR 257 | 1.54 |
| Ebecryl 170 | 2.29 |
| | 100.0 |

ELM-136-52 is a 67% dispersion of Rhett P3 in CN991, available from Deft, Inc. of Irvine, Calif. Blue G49UV15 and Red G19UV57 are pigment dispersions available from Sun Chemical Corp. of Parsippany, N.J. PI 130 is a liquid photoinitiator concentrate available from Light Curable Coatings.

| Example 3 | wt. % |
|---|---|
| ELM-136-52 | 52.97 |
| Airex 900 | 0.53 |
| Poly bd R20LM | 2.65 |
| CN966J75 | 14.20 |
| Ti-Pure R960 | 7.94 |
| Syloid ED-30 | 2.12 |
| S-381-N5 | 1.05 |
| Talc 399 | 2.12 |
| SR506D | 10.59 |
| PI 191 | 4.24 |
| Ebecryl 170 | 1.59 |
| | 100.00 |

S-381-N5 is a filler wax with good UV resistance available from Shamrock Technologies, Inc. of Newark, N.J. and Talc 399 is a filler available from Mineral and Pigment Solutions, Inc. of South Plainfield, N.J.

| Example 4 | wt. % |
|---|---|
| ELM-136-52 | 52.63 |
| Airex 900 | 0.53 |
| Polybd R20LM | 2.63 |
| CN966J75 | 14.11 |
| Ti-Pure R960 | 7.90 |
| Syloid ED-30 | 2.10 |
| S-381-N5 | 1.05 |
| Talc 399 | 2.10 |
| SR492 | 11.16 |
| PI 191 | 4.21 |
| Ebecryl 170 | 1.58 |
| | 100.00 |

| Example 5 | wt. % |
|---|---|
| ELM-136-52 | 52.97 |
| Airex 900 | 0.53 |
| Poly bd R20LM | 2.65 |
| CN966J75 | 14.20 |
| Ti-Pure R960 | 7.94 |
| Syloid ED-30 | 2.12 |
| S-381-N5 | 1.05 |
| Talc 399 | 2.12 |
| Pentaerythritol allyl ether | 10.59 |
| PI 191 | 4.24 |
| Ebecryl 170 | 1.59 |
| | 100.00 |

| Example 6 | wt. % |
|---|---|
| ELM-136-48 | 58.72 |
| Airex 900 | 0.59 |
| Tioxide TR93 | 1.76 |
| Syloid ED-30 | 2.35 |
| S-381-N5 | 0.86 |
| Talc 399 | 2.35 |
| Black 97076 | 0.59 |
| Pentaerythritol allyl ether | 5.63 |
| Dipropylene glycol allyl ether methacrylate | 4.70 |
| PI 191 | 3.52 |
| Octa-Soligen 69HS | 1.56 |
| Allyl cinnamate | 2.11 |

| Example 6 | wt. % |
|---|---|
| Roskydal UA VP LS 2396 | 13.85 |
| Clear Catalyst 11 | 1.41 |
| | 100.00 |

All components were mixed, with the Roskydal UA VP LS 2396 and the Clear Catalyst 11 added last. The coating was immediately applied after the Roskydal UA VP LS 2396 and the Clear Catalyst 11 were added. ELM-136-48 is a 62.4% dispersion of Rhett P3 in CN991, available from Deft, Inc. of Irvine, Calif. Octa-Soligen® 69HS is a drier activator available from Borchers USA of Pittsburgh, Pa.

Accordingly, various exemplary embodiments of a corrosion-resistant, chromium-free, self-priming coating that is curable by ultraviolet light have been described. The coatings do not contain chromium, which can be toxic and carcinogenic, and release minimal or no VOCs and HAPs. The coatings can be applied as single-application coatings that can be cured quickly by ultraviolet light, thus decreasing vehicle or aircraft operational unavailability. In addition, the protective coatings can be used for military and commercial aircraft and spacecraft, marine ship applications, automotive applications, and other vehicle and industrial applications. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

We claim:

1. A gloss exterior surface of an aircraft, comprising:
an ultraviolet light-cured, single, chromium-free, self-priming coating consisting essentially of an oligomer, a monomer, a photoinitiator, a pigment, and a corrosion inhibitor;
the surface of the aircraft comprising aluminum or an aluminum alloy;
wherein the single coating is sufficient to provide corrosion resistance and a desired color and gloss to the surface; and
wherein the oligomer is selected from the group consisting of aliphatic polyether urethane acrylates, diacrylates, and triacrylates, and aliphatic polyester urethane acrylates, diacrylates, and triacrylates, and the photoinitiator is an acylphosphine oxide or a bisacylphosphine oxide.

2. The gloss exterior surface of claim 1, wherein the corrosion inhibitor comprises an organic/inorganic hybrid corrosion inhibitor.

3. The gloss exterior surface of claim 1, wherein the monomer is selected from the group consisting of acrylates, methacrylates, diacrylates, triacrylates, polyacrylates, allyl compounds, vinyl ethers, vinyl esters, vinyl carboxylic acids, vinyl carboxylic acid salts, vinyl amides, unsaturated derivatives thereof, and combinations thereof.

4. The gloss exterior surface of claim 1, prepared by the method of:
- combining at least the oligomer, the monomer, the photoinitiator, and the corrosion inhibitor to yield the chromium-free, self-priming coating;
- applying in a single application the chromium-free, self-priming coating to the surface of the aircraft to form the single coating that is sufficient to provide corrosion resistance to the surface and the desired color and gloss to the surface; and
- curing the chromium-free, self-priming coating with ultraviolet light to form the gloss exterior surface of the aircraft.

5. A coating on an exterior surface of an aircraft comprising aluminum or an aluminum alloy, wherein as a single coating, the coating is sufficient to provide corrosion resistance and a desired color and gloss to the surface, the coating comprising:
- an acrylated oligomer selected from the group consisting of acrylates, methacrylates, diacrylates, triacrylates, and polyacrylates;
- a monomer selected from the group consisting of acrylates, methacrylates, diacrylates, triacrylates, polyacrylates, allyl compounds, vinyl ethers, vinyl esters, vinyl carboxylic acids, vinyl carboxylic acid salts, vinyl amides, unsaturated dicarboxylic acids, derivatives thereof, and combinations thereof;
- a pigment;
- a photoinitiator, wherein the photoinitiator is an acylphosphine oxide or a bisacylphosphine oxide; and
- a chromium-free corrosion inhibitor.

6. The coating of claim 5, wherein the acrylated oligomer is selected from
- the group consisting of aliphatic polyether urethane acrylates, diacrylates, triacrylates, and polyacrylates; aliphatic polyester urethane acrylates, diacrylates, triacrylates, and polyacrylates; aromatic polyether urethane acrylates, diacrylates, triacrylates, and polyacrylates; aromatic polyester urethane acrylates, diacrylates, triacrylates, and polyacrylates; polyester acrylates, diacrylates, triacrylates, and polyacrylates; polyether acrylates, diacrylates, triacrylates, and polyacrylates; epoxy acrylates, diacrylates, triacrylates, and polyacrylates; polyamine acrylates, diacrylates, triacrylates, and polyacrylates; and acrylated acrylic oligomers.

7. The coating of claim 5, wherein the acrylated oligomer is selected from the group consisting of aliphatic polyether urethane acrylates, diacrylates, and triacrylates, and aliphatic polyester urethane acrylates, diacrylates, and triacrylates.

* * * * *

UNITED STATES PATENT AND TRADEMARK OFFICE
CERTIFICATE OF CORRECTION

PATENT NO. : 10,266,717 B2
APPLICATION NO. : 14/562157
DATED : April 23, 2019
INVENTOR(S) : Deantoni et al.

Page 1 of 1

It is certified that error appears in the above-identified patent and that said Letters Patent is hereby corrected as shown below:

In the Claims

In Claim 3, Column 12, Lines 66-67 incorrectly recite:
"acids, vinyl carboxylic acid salts, vinyl amides, unsaturated derivatives thereof, and combinations thereof"

Should recite:
"acids, vinyl carboxylic acid salts, vinyl amides, unsaturated dicarboxylic acids, derivatives thereof, and combinations thereof."

Signed and Sealed this
Seventh Day of April, 2020

Andrei Iancu
*Director of the United States Patent and Trademark Office*